US012377670B2

(12) United States Patent
Kang et al.

(10) Patent No.: US 12,377,670 B2
(45) Date of Patent: Aug. 5, 2025

(54) PRINTING APPARATUS AND PRINTING METHOD

(71) Applicant: BIXOLON Co., Ltd., Seongnam-si (KR)

(72) Inventors: Chan Wook Kang, Seongnam-si (KR); Nam Young Kim, Seongnam-si (KR); Hyung Jae Ko, Seongnam-si (KR); Jae Hoon Jeong, Seongnam-si (KR)

(73) Assignee: BIXOLON Co., Ltd., Seongnam-si (KR)

( * ) Notice: Subject to any disclaimer, the term of this patent is extended or adjusted under 35 U.S.C. 154(b) by 86 days.

(21) Appl. No.: 18/503,667

(22) Filed: Nov. 7, 2023

(65) Prior Publication Data

US 2024/0149595 A1 May 9, 2024

(30) Foreign Application Priority Data

Nov. 8, 2022 (KR) ........................ 10-2022-0148241
Nov. 7, 2023 (KR) ........................ 10-2023-0152365

(51) Int. Cl.
*B41J 11/66* (2006.01)
*B41J 2/32* (2006.01)

(52) U.S. Cl.
CPC ............... *B41J 11/663* (2013.01); *B41J 2/32* (2013.01)

(58) Field of Classification Search
CPC .. B41J 11/663; B41J 2/32; B41J 2/315; B41F 16/00
See application file for complete search history.

(56) References Cited

U.S. PATENT DOCUMENTS 6,606,107 B2 8/2003 Minowa et al.
2009/0231623 A1* 9/2009 Kuwahara .......... G06K 15/1806 358/1.15
2009/0238594 A1* 9/2009 Barton ................. G03G 15/205 399/69

FOREIGN PATENT DOCUMENTS

JP 2017-132183 * 8/2017 .............. B41J 29/38
JP 2024-139921 * 10/2024 ................ B41J 2/21
KR 10-1999-0059643 A 7/1999
KR 10-0579350 B1 5/2006
KR 10-1268560 B1 5/2013
KR 10-2014-0125610 A 10/2014

* cited by examiner

*Primary Examiner* — Kristal Feggins
(74) *Attorney, Agent, or Firm* — Bridgeway IP Law Group, PLLC; Jihun Kim

(57) ABSTRACT

Disclosed herein are a printing apparatus that is mounted with roll-shaped drawable printing paper made of thermal paper whose color changes by heat, performs printing on the printing paper and cuts the printing paper via a cutter, and a printing method that is performed by the printing apparatus.

20 Claims, 6 Drawing Sheets

PRINTING APPARATUS AND PRINTING METHOD

CROSS-REFERENCE TO RELATED APPLICATION

This application claims priority from Korean Patent Application No. 10-2022-0148241 filed on Nov. 8, 2022, and Korean Patent Application No. 10-2023-0152365 filed on Nov. 7, 2023, each of which is incorporated herein by reference in its entirety.

BACKGROUND

1. Technical Field

The embodiments disclosed herein relate to a printing apparatus and a printing method, and more particularly to a printing apparatus and printing method that identify the color of printing paper and then adjust the intensity of printing according to the color or brightness of the printing paper, thereby improving the visibility of content printed on the printing paper.

2. Description of the Related Art

In general, thermal transfer printers are generally used to print receipts, labels, etc. Furthermore, in thermal transfer printers, thermal paper whose color changes according to heat is used as printing paper. Thermal paper has been manufactured using bisphenol A, widely known as an endocrine disruptor, as a color development catalyst. Accordingly, there have been increasing concerns that repeated exposure to receipts may cause adult diseases or breast cancer.

Accordingly, recently, eco-friendly thermal paper without bisphenol A, i.e., BPA-free eco-friendly thermal paper, has been produced. In this case, eco-friendly thermal paper is developed in white as before, but it is also being developed in various colors, such as blue, according to the raw material of paper or coloring dye.

However, printers perform the same type of printing operation regardless of the type of printing paper, so that a problem arises in that the visibility of printed content is deteriorated depending on the type or color of printing paper.

In other words, when printing paper is blue paper, a problem arises in that the visibility of content is degraded compared to that in the case of white paper.

Therefore, there is a demand for technology for overcoming the above-described problem.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

SUMMARY

An object of the embodiments disclosed herein is to propose a printing apparatus and printing method in which the printing apparatus may identify the color of printing paper and then adjust the intensity of printing according to the identified color of the printing paper.

As a technical solution for accomplishing the above-described object, according to an embodiment, there is provided a printing apparatus, the printing apparatus being mounted with roll-shaped drawable printing paper made of thermal paper whose color changes by heat, performing printing on the printing paper and cutting the printing paper via a cutter, the printing apparatus including: a printer configured to perform printing by providing heat to the printing paper via a print head while transferring the printing paper at a predetermined speed via a platen roller; a sensor configured to identify the color of the printing paper; and a controller configured to control the printer based on a detection result of the sensor to adjust the intensity of printing for the printing paper while adjusting at least one of the printing speed of the printing paper and the heating time for the printing paper.

According to another embodiment, there is provided a printing method, the printing method being performed by a printing apparatus that transfers roll-shaped printing paper, made of thermal paper whose color changes by heat, at a predetermined speed, performs printing by providing heat to the printing paper and cuts the printing paper, the printing method including: identifying the color of the printing paper; and adjusting the intensity of printing for the printing paper by adjusting at least one of the transfer speed of the printing paper and the heating time for the printing paper according to the identified color of the printing paper while performing printing on the printing paper.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1:
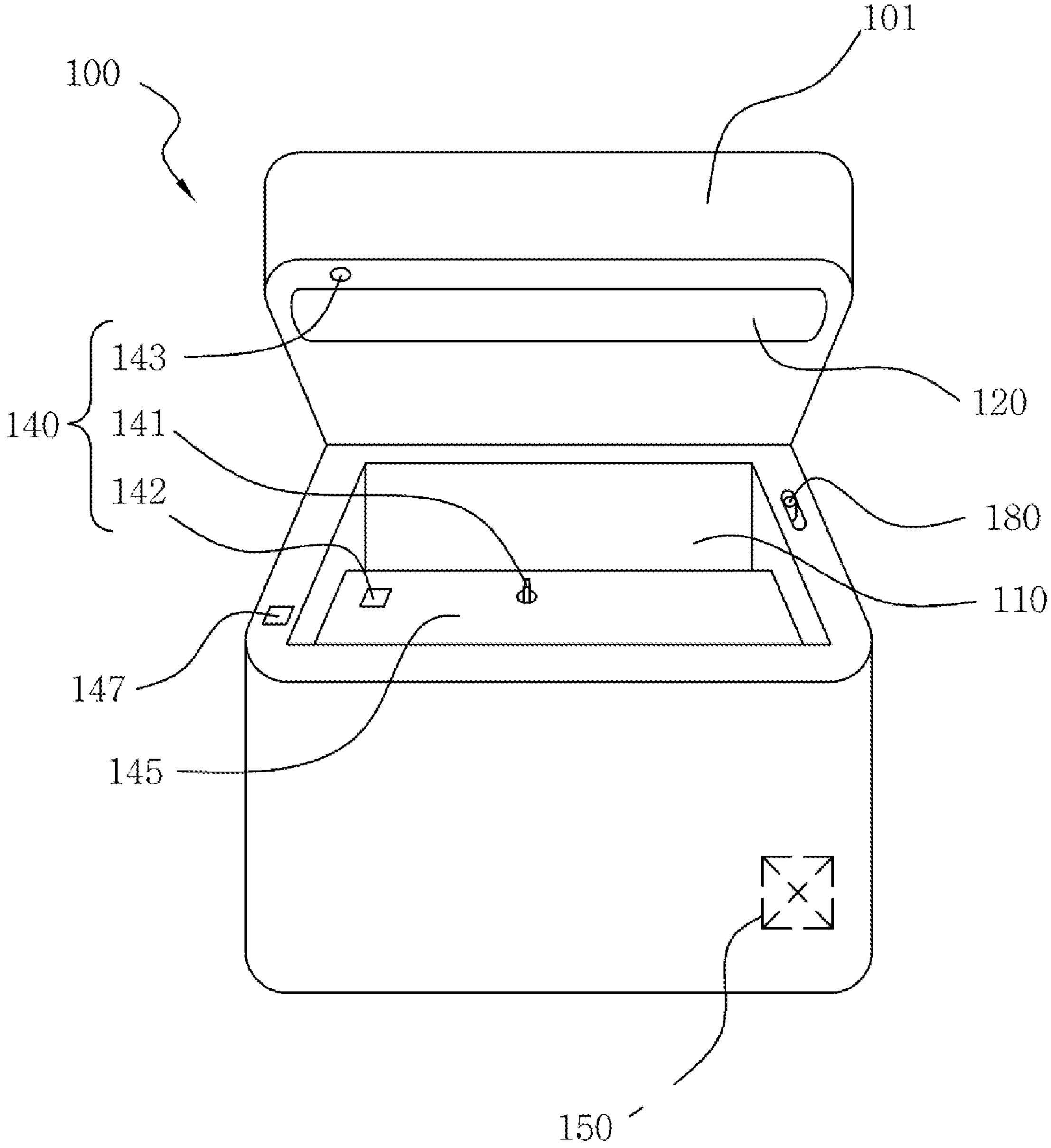
FIG. 1 is a diagram showing a printing apparatus according to an embodiment.

Various embodiments will be described in detail below with reference to the accompanying drawings. The following embodiments may be modified and practiced in various different forms. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is "directly connected" to the other component but also a case where the one component is "connected to the other component with a third component disposed therebetween." Furthermore, when one component is described as "including" another component, this does not mean that the one component does not exclude a third component but means that the one component may further include a third component, unless explicitly described to the contrary.

Figure 2:
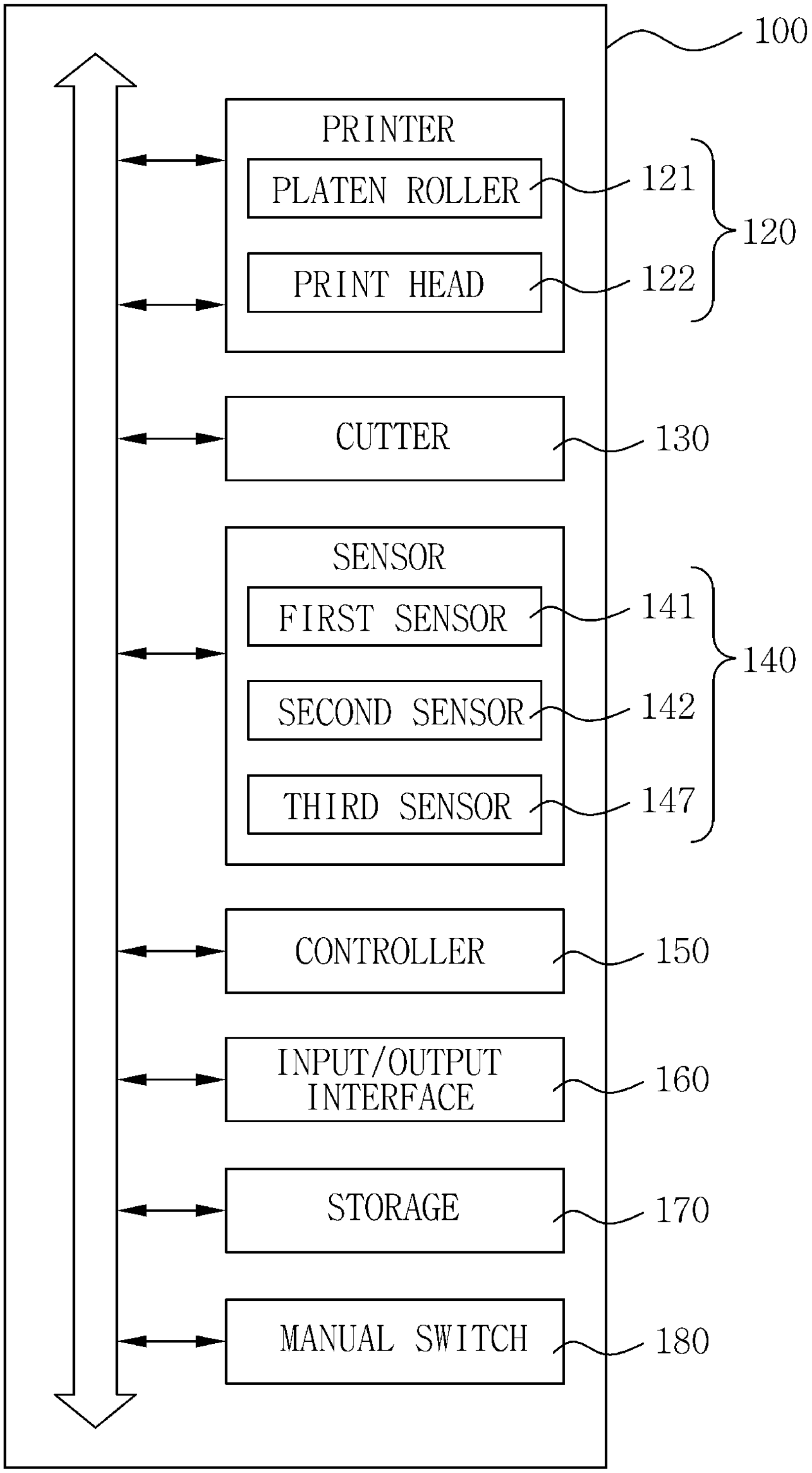
FIG. 2 is a diagram showing the configuration of the printing apparatus according to the embodiment.

FIGS. 1 and 2 are diagrams showing a printing apparatus 100 according to an embodiment.

Referring to FIGS. 1 and 2, the printing apparatus 100 according to the embodiment may be, e.g., a receipt printing apparatus that prints receipts. The printing apparatus 100 is provided with a cover 101 and a paper accommodation portion 110 so that roll-shaped printing paper composed of thermal paper whose color changes according to heat can be rotatably accommodated in the printing apparatus 100.

Furthermore, the printing apparatus 100 may include: a printer 120 configured to print content by applying heat to printing paper while transferring the printing paper at a predetermined speed in a printing direction; and a cutter 130 configured to cut printing paper inside a discharge portion through which printed printing paper is discharged to the outside.

The printing apparatus 100 may further include: a sensor 140 configured to identify the type (color) of printing paper; and a controller 150 configured to control the printer 120 according to the content to be printed on printing paper and to also control the driving status of the cutter, etc.

The printer 120 may include: a platen roller 121 configured to transfer printing paper by pulling the printing paper while being rotated by a step motor in order to transfer the printing paper; and a print head 122, such as a thermal print dead (TPH), configured to print content on printing paper by providing heat to the printing paper composed of thermal paper through heating elements included in writing elements.

In this case, the platen roller 121 and the print head 122 constituting part of the printer 120 may each be operated under the control of the controller 150, and may be implemented in various locations at which they can be operated with printing paper disposed therebetween. The sensor 140 is configured to identify the color of printing paper, and may include, e.g., a first sensor 141 and a second sensor 142.

The first sensor 141 and the second sensor 142 may be installed on a supporter 145 configured to support the bottom of printing paper while forming a transfer path for the printing paper.

The first sensor 141 is configured to identify the presence/absence of printing paper. For example, the first sensor 141 may be composed of a mechanical sensor installed to protrude from the supporter 145 toward printing paper and configured to elastically move downward when a side above it is blocked by printing paper and protrude upward due to elastic force when there is no printing paper.

The second sensor 142 is configured to identify the color of printing paper. For example, the second sensor 142 may be composed of a photosensor installed in the supporter 145, and may detect the amount of light that is reflected and received after being radiating toward printing paper being transferred above the supporter 145. Furthermore, the controller 150 may determine and identify the color of printing paper based on the range of voltage values that vary depending on the amount of reflected light that is received by the second sensor 142.

For example, the controller 150 may determine printing paper to be white paper when the voltage value is 2 V or higher, and may determine printing paper to be colored paper such as blue paper when the voltage value is lower than 2 V.

Meanwhile, according to another embodiment, the printing apparatus 100 may further include a third sensor 147 configured to detect the opening/closing of the cover 101 and apply the results of the detection to the controller 150. Accordingly, whenever the opening/closing of the cover 101 is detected, the controller 150 may operate the first sensor 141 and the second sensor 142 to detect the presence/absence of printing paper and the color of the printing paper again. Furthermore, the intensity of printing for printing paper may be adjusted according to the results of the detection.

Meanwhile, according to another embodiment, the sensor 140 may be composed of only the second sensor 142 with the above-described first sensor 141 omitted therefrom, and may identify the presence/absence of printing paper and the color of the printing paper.

In this case, the sensor 140 may include a through hole 143, as shown in FIG. 1. More specifically, the through hole 143 is configured to detect the absence of printing paper by suppressing the reflection of light when there is no printing paper. The through hole 143 may be formed as a hole in one side wall opposite the second sensor 142, and may suppress the reflection of light radiated from the second sensor 142.

Accordingly, the controller 150 may determine and identify both the presence/absence of printing paper and the color of the printing paper based on the voltage value that varies depending on the amount of reflected light radiated and received from the second sensor 142.

For example, the controller 150 may determine printing paper to be white paper when the voltage value is 2 V or higher and determine printing paper to be colored paper such as blue paper when the voltage value is 0.5 V or higher and lower than 2 V, and may determine that there is no printing paper when the voltage value is 0.5 V.

Alternatively, in another embodiment, the second sensor 142 may be composed of an image sensor and determine both the presence/absence of printing paper and the color of the printing paper. When the second sensor 142 is composed of an image sensor, the above-described through hole 143 may be omitted.

Meanwhile, the controller 150 may adjust the intensity of printing for printing paper according to the color of the printing paper while controlling the printer 120 based on the detection results of the sensor 140.

In this case, the controller 150 may adjust the intensity of printing for printing paper by adjusting the transfer speed of the printing paper or the heating time of the printing paper passing over the print head 122 based on the detection results of the sensor 140.

For example, the controller 150 may adjust the heating time of printing paper passing over the print head 122 by adjusting the transfer speed of the printing paper while adjusting the rotation speed of the platen roller 121 according to the identified color of the printing paper.

More specifically, when printing paper, identified by the sensor 140 while printing is performed on white printing paper, is colored (blue) paper, i.e., when the brightness of printing paper is darker than that of white paper, the controller 150 may perform adjustment so that content can be printed more clearly on the printing paper by reducing the rotation speed of the platen roller 121 in order to ensure that the time for which the printing paper is heated by the print head 122 is longer. In contrast, when printing paper, identified by the sensor 140 while printing is performed on colored printing paper, is while paper, the controller 150 may perform adjustment so that the intensity of printing can become lower than that for colored paper by increasing the rotation speed of the platen roller 121 in order to ensure that the time for which the printing paper is heated by the print head 122 is shorter.

Alternatively, in another embodiment, the controller 150 may adjust the density of printing or the type and thickness of print font in a method of controlling the intensity of printing for printing paper.

Meanwhile, in still another embodiment, the printing apparatus 100 may further include a manual switch 180. The manual switch 180 is configured to prepare for a case in which an error occurs in the identification of the type of printing paper due to a cause such as the accumulation of paper dust in the sensor 140 based on continued use of the printing apparatus 100. The manual switch 180 may allow one to be selected from the manual setting of the type (color) of printing paper through user input and the automatic setting of the type of printing paper based on the detection results of the sensor 140.

The manual switch 180 may be provided on one side of the paper accommodation portion 110 that is observed when the cover 101 of the printing apparatus 100 is opened. The manual switch 180 may be provided in the form of a lever or button to select one of options corresponding to the number of types of printing paper compatible with the printing apparatus 100. For example, when there are two types of printing paper available in the printing apparatus 100, i.e., white paper and blue paper, the manual switch 180 may be provided as a toggle switch that can select one of white paper and blue paper or automatic detection.

In still another embodiment, the printing apparatus 100 may further include an input/output interface 160 and storage 170.

The input/output interface 160 is connected to an external device, and is configured to transmit and receive data, to receive input related to a printing operation or settings from a user, and to display the progress status of a printing operation. For example, the input/output interface 160 may include a communication chipset, input/output ports, etc. for wired or wireless communication with a host device 200. Furthermore, for example, the input/output interface 160 may include a display panel, a touch screen, and hard buttons for receiving input and displaying information through a user interface (UI) screen.

The storage 170 may include volatile memory and non-volatile memory. Various types of programs and data may be stored in the storage 170. In particular, the storage 170 may store a program adapted to determine the type (color) of printing paper through the sensor 140 and perform a printing operation accordingly.

Figure 3:
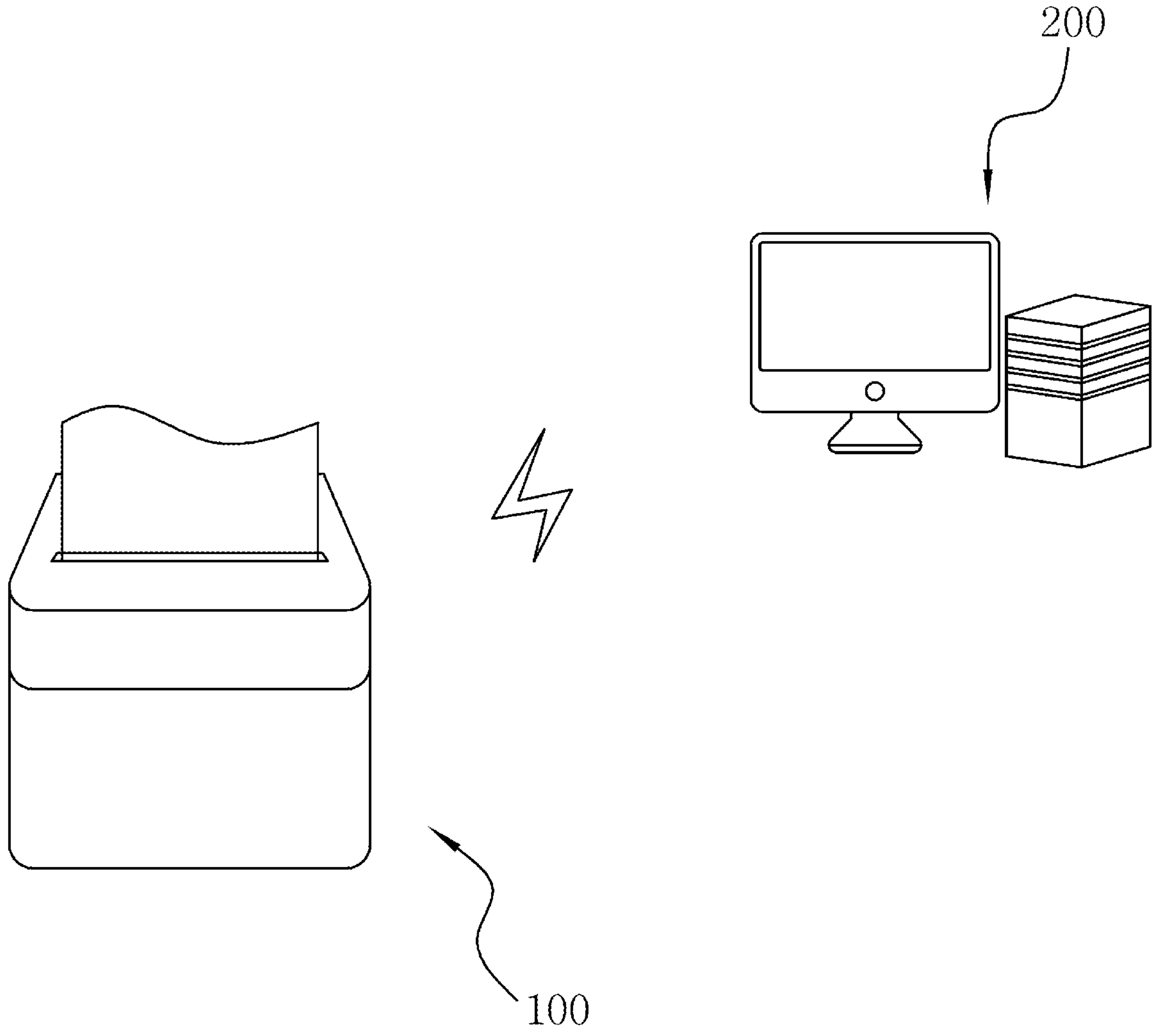
FIG. 3 is a diagram showing the printing apparatus according to the embodiment and a host device.

Referring to FIG. 3, the printing apparatus 100 may be connected to the host device 200 and transmit and receive data. The printing apparatus 100 may receive data on print content from the host device 200 or perform a printing operation under the control of the host device 200.

In this case, when colored printing paper is detected via the sensor 140, the controller 150 may query the host device 200 whether to adjust the intensity of printing. For example, the controller 150 may apply information about the printing apparatus 100 through an automatic status back (ASB) command that automatically notifies the host device 200 of various types of status information of the printing apparatus 100.

In this case, the controller 150 may query the host device 200 via an ASB command formed by including information about the type of printing paper in the ASB command through the adding of a bit for the type (color) of printing paper to the ASB command, and may adjust the intensity of printing for the printing paper based on a response received from the host device 200.

Furthermore, the controller 150 may monitor a historical level for the heating operation of the print head 122 according to the transfer speed of the platen roller 121 in order to prevent printing elements included in the print head 122 from being deteriorated due to excessively high temperature.

In other words, the controller 150 monitors the heating record in the range from the time at which the printing elements constituting the print head 122 are driven back to a specific number of steps ago. In this case, the number of steps may vary depending on the printing speed. The number of steps for the monitoring of the heating record is called a historical level.

For example, when the historical level is three steps, the controller 150 monitors the heating record in the range from the time at which the printing element of the print head 122 is driven back to three steps ago. When heating was performed only before three steps, the controller 150 may perform heating on the printing elements. In contrast, when heating was performed on the printing elements before one step, the controller 150 may not perform heating on the printing elements.

In this case, when the print head 122 performs heating in the same manner as when the printing speed is fast even though the printing speed formed by the platen roller 121 is reduced, the temperature of the printing elements may become excessively high, thereby increasing the possibility of deterioration. Accordingly, the controller 150 may change the historical level when the printing speed changes.

For example, when the printing speed (the transfer speed) formed by the platen roller 121 is decreased to a lower speed, the controller 150 may lower the historical level to a lower level. For example, when the historical level is lowered from three steps to two steps, the controller 150 may monitor the heating record in the range from the time at which the printing elements of the print head 122 are driven back to two steps ago, and may determine whether the print head 122 is heated and the intensity of heating based on the results of the monitoring. It will be apparent that the controller 150 may change the historical level to a higher level when the printing speed (the transfer speed) formed by the platen roller 121 is changed to a higher speed.

Meanwhile, in another embodiment, black marks (not shown) may be formed on one of both sides of printing paper at regular intervals along the longitudinal direction of the printing paper.

The black marks are intended to demarcate the printing area of printing paper or provide cutting positions. The black marks may be formed by printing a pattern having a predetermined length in the printing direction on printing paper using colored dye such as black dye so that it can be recognized by the sensor 140. For example, the black marks may have a predetermined rectangular pattern.

The above-described sensor 140 may identify black marks while identifying the color of printing paper and apply the results of the identification to the controller 150.

In this case, as the black marks may be recognized by the sensor 140, a pattern may be provided to the user through the input/output interface 160. Accordingly, the user may set a printing pattern through the pattern of the black marks. For example, the user may perform setting so that content is printed whenever a second black mark is recognized. The controller 150 may control the printer 120 to perform a printing job according to the setting of the user.

Meanwhile, among the black marks formed at regular intervals on the printing paper, the black mark adjacent to the end point of the printing paper is formed to be longer or shorter in length, thereby allowing the controller 150 to recognize the near-end of the printing paper.

Accordingly, the controller 150 may recognize the near end of the printing paper based on the pattern of the black marks, and may provide a near-end alarm through the input/output interface 160 via a visual signal such as the flashing of an LED or display or an auditory signal such as a beep sound. The controller 150 may perform an event that transmits information to the host device 200.

Meanwhile, according to an embodiment, when the opening/closing of the cover 101 is detected through the above-described third sensor 147, printing paper may have been replaced with new paper. Accordingly, in order to reduce the load on the first sensor 141 and the second sensor 142, the controller 150 may operate the first sensor 141 and the second sensor 142 at regular intervals rather than continuously operating them.

More specifically, when the opening/closing of the cover 101 is detected, the controller 150 operates the sensor 140 only while the printing paper is transferred over a predetermined length so that the color of the printing paper and the black marks can be identified and also the near area of the printing paper can be detected, and may perform printing after detecting the near end of the printing paper. When the near end of the printing paper is not detected until the printing length of the printing paper reaches a predetermined value (for example, 50 m) during a printing process, the controller 150 may re-operate the sensor 140 because the near end of the printing paper may have been reached.

In this case, the controller 150 may determine the transfer length of the printing paper based on the revolutions per minute (RPM) of the step motor that rotates the platen roller 121.

Figure 4:
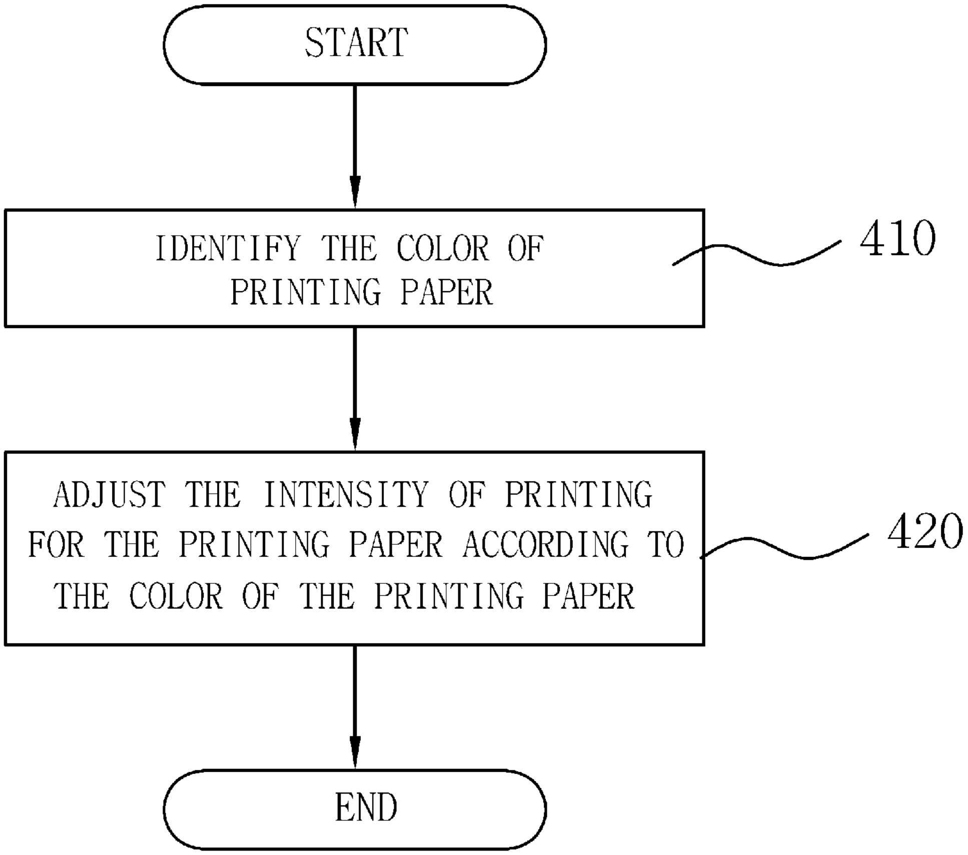
FIGS. 4 to 6 are diagrams showing a printing method according to an embodiment.
Figure 5:
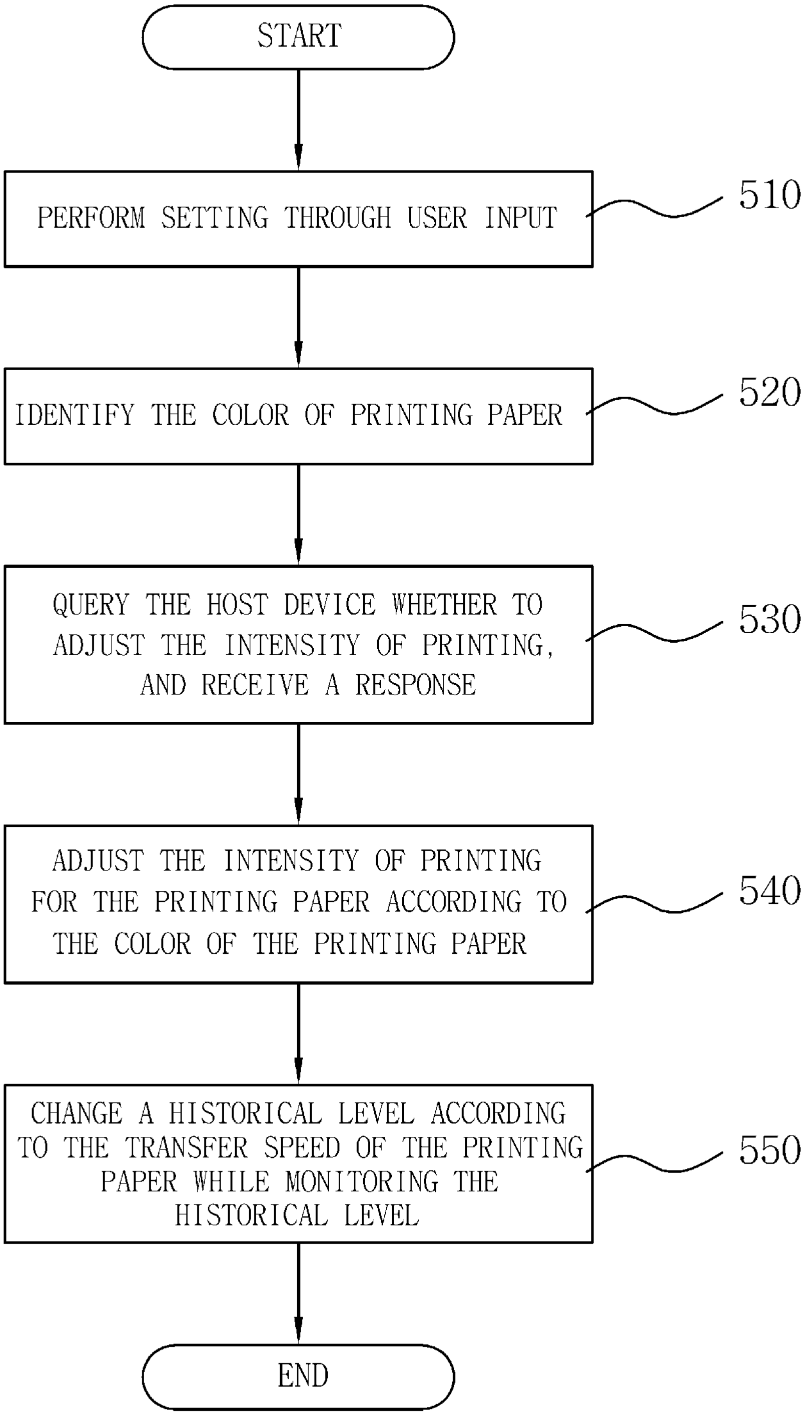
Figure 6:
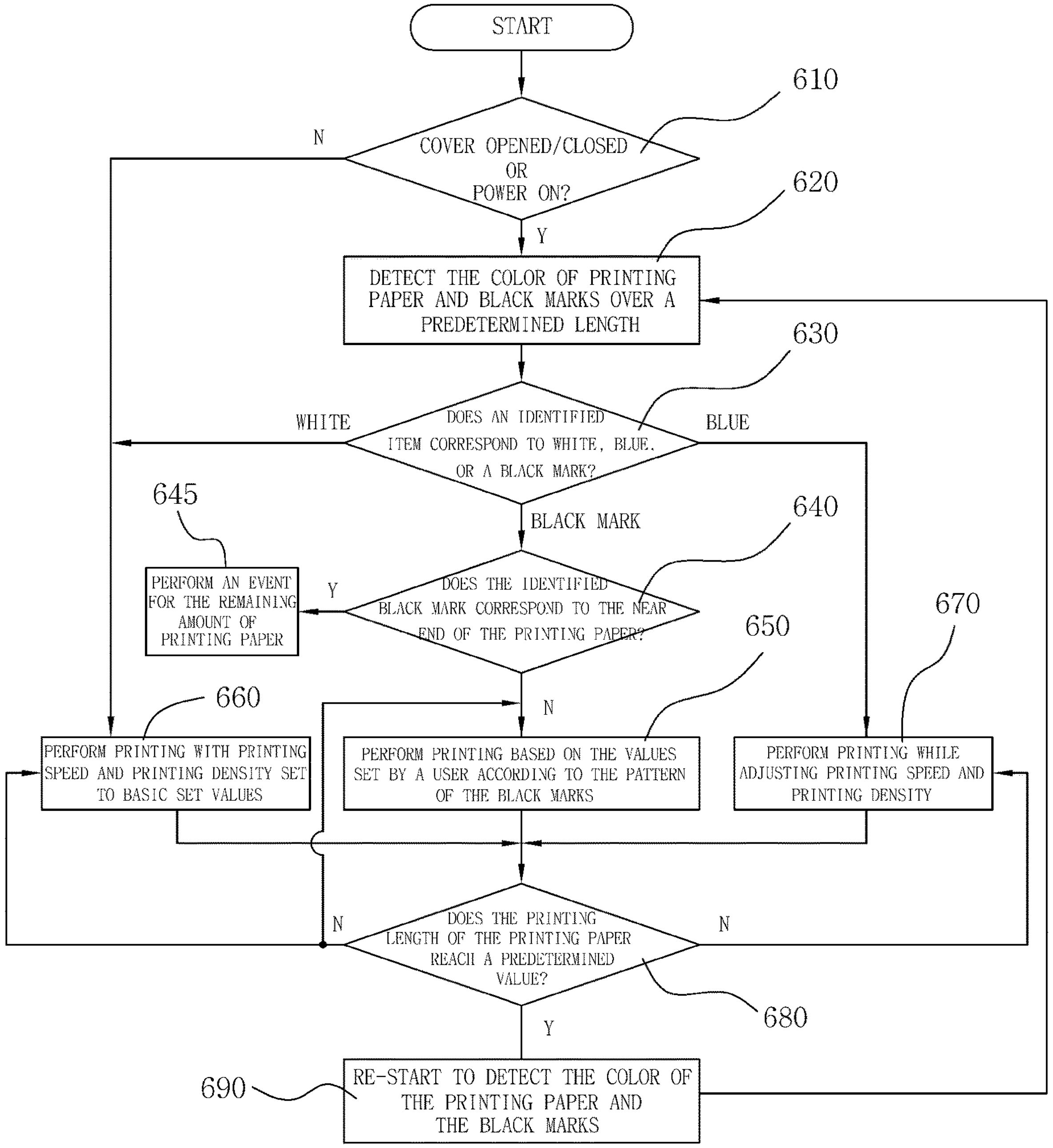

A printing method performed by the above-described printing apparatus 100 will be described below. FIGS. 4 to 6 are flowcharts illustrating a printing method according to an embodiment.

Referring to FIG. 4, the printing method according to the embodiment may basically include step 410 of identifying printing paper and step 420 of adjusting the intensity of printing.

Step 410 of identifying printing paper is the step of determining and identifying the color of printing paper while detecting the presence/absence of the printing paper accommodated in the paper accommodation portion 110. In this case, the controller 150 may detect the presence/absence of printing paper through the first sensor 141 constituting part of the sensor 140, and may determine and identify the color of the printing paper based on the range of voltage values that vary depending on the amount of reflected light that is received through the second sensor 142.

Furthermore, in step 410 of identifying printing paper, when the sensor 140 is composed of only the second sensor 142, the presence/absence of the printing paper and color of the printing paper may be identified through the second sensor 142. In this case, the controller 150 may identify both the presence/absence of the printing paper and the color of the printing paper based on the range of voltage values that vary depending on the amount of reflected light that is received through the second sensor 142.

Step 420 of adjusting the intensity of printing is the step in which the controller 150 adjusts the intensity of printing for the printing paper according to the color of the printing paper identified in step 410 of identifying printing paper while printing content on the printing paper by operating the platen roller 121 and the print head 122. In this case, the controller 150 may adjust the transfer speed of the printing paper by adjusting the rotation speed of the platen roller 121 according to the color of the printing paper identified through the sensor 140. Through this, the intensity of printing for the printing paper may be adjusted by adjusting the heating time of the printing paper formed by the print head 122. More specifically, when blue printing paper is detected through the sensor 140, the controller 150 may reduce the transfer speed of the printing paper by adjusting the rotation speed of the platen roller 121. Through this, the heating time of the printing paper formed by the print head 122 may be adjusted to a longer time, so that an adjustment can be made such that content can be printed relatively clearly on the printing paper.

Referring to FIG. 5, according to an embodiment, the printing method may further include step 510 of performing setting before performing step 520 of identifying printing paper and step 540 of adjusting the intensity of printing.

In this case, step 520 of identifying printing paper and step 540 of adjusting the intensity of printing are the same as the above-described steps 410 and 420, respectively, so that detailed descriptions thereof will be omitted.

Step 510 of performing setting is the step of preparing for a case in which an error occurs in the identification of the type of printing paper performed by the sensor 140. In step 510 of performing setting, one may be selected from the manual setting of the color of the printing paper through user input and the automatic setting of the color of the printing paper through the sensor 140.

Furthermore, according to an embodiment, the printing method may further include step 530 of, when colored printing paper is detected through step 520, querying the host device 200 whether to adjust the intensity of printing before step 540 of adjusting the intensity of printing.

In this case, the controller 150 may notify the host device 200 of information about the color of the printing paper by adding information about the type (color) of printing paper to an ASB command and then applying the ASB command while applying the status information of the printing apparatus 100 through the ASB command. The controller 150 may perform step 540 of adjusting the intensity of printing based on a response received from the host device 200.

According to an embodiment, the printing method may further include step 550 of changing a historical level according to the transfer speed of the printing paper while monitoring the historical level.

In this case, the controller 150 may monitor a historical level for the heating operation of the printing head 122 according to the transfer speed formed by the platen roller 121, and may change the historical level to a lower level when the printing paper is detected as blue paper and thus the transfer speed of the printing paper is changed to a lower speed. In other words, when the printing speed decreases to a lower speed, the controller 150 may lower the historical level to a lower level, thereby preventing the printing elements constituting the print head 122 from being deteriorated. It will be apparent that the controller 150 may change the historical level to a higher level when the printing speed (the transfer speed) formed by the platen roller 121 is changed to a higher speed.

Meanwhile, when the cover 101 of the printing apparatus is opened/closed, the printing method may be performed, as shown in FIG. 6.

More specifically, the controller 150 may detect the opening/closing of the cover 101 through the third sensor 147 in step 610. In this case, when the opening/closing is not detected, printing may be performed based on preset set values in step 660. In contrast, when the opening/closing is detected, the color of the printing paper and the black marks may be detected by operating the sensor 140 only while the printing paper is transferred over a predetermined length in step 620.

Furthermore, the controller 150 may check whether the detection result of the sensor 300 corresponds to white, blue, or a black mark in step 630. When the detection result of the sensor 300 corresponds to white, the controller 150 may adjust the printer 120 to fit the printing speed and the density of printing to white paper and then perform printing in step 660. In contrast, when the detection result of the sensor 300 corresponds to blue, the controller 150 may adjust the printer 120 to fit the printing speed and the density of printing to blue paper and then perform printing in step 670.

Furthermore, when the detection result of the sensor 300 corresponds to a black mark, the controller 150 may check whether the black mark corresponds to the near end of the printing paper in step 640. When the near end is recognized, the controller 150 may perform an event that transmits a near-end alarm to the input/output interface 160 or the host device 200 in step 645. In contrast, when the detected black mark does not correspond to the near end, the controller 150 may perform printing according to a printing pattern that is set by the user according to the black mark in step 650.

Furthermore, in step 680, the controller 150 may check whether the printing length of the printing paper for which the near end is not recognized reaches a predetermined value during the printing process in step 650, 660, or 670. When the printing length of the printing paper reaches the predetermined value, the sensor 140 may be re-operated to re-detect the color of the printing paper and the black marks in step 690.

The printing method performed through the printing apparatus 100 described above may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

The printing method described above may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

The printing method described above may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The term "unit" used in the above-described embodiments means software or a hardware component such as a field-programmable gate array (FPGA) or application-specific integrated circuit (ASIC), and a "unit" performs a specific role. However, a "unit" is not limited to software or hardware. A "unit" may be configured to be present in an addressable storage medium, and also may be configured to run one or more processors. Accordingly, as an example, a "unit" includes components, such as software components, object-oriented software components, class components and task components, processes, functions, attributes, procedures, subroutines, segments in program code, drivers, firmware, microcode, circuits, data, a database, data structures, tables, arrays, and variables.

Components and a function provided in "unit(s)" may be coupled to a smaller number of components and "unit(s)" or divided into a larger number of components and "unit(s)."

In addition, components and "unit(s)" may be implemented to run one or more central processing units (CPUs) in a device or secure multimedia card.

As described above, according to the printing device 100 and printing method of some embodiments, the intensity of printing may be adjusted by adjusting the transfer speed of the platen roller 121 or the heating time for printing paper passing over the print head 122 according to the color of the printing paper determined and identified by the sensor 140, so that the visibility of content printed on the printing paper can be improved.

According to any one of the above-described solutions, there are proposed the printing apparatus and printing method in which the printing apparatus may identify the color of printing paper and adjust the intensity of printing according to the identified color of the printing paper.

More specifically, according to any one of the above-described solutions, the intensity of printing may be adjusted by adjusting the transfer speed of the platen roller or the heating time for the printing paper passing over the print head according to the identified color of the printing paper, so that the visibility of content printed on printing paper can be improved.

According to any one of the above-described solutions, the second sensor constituting part of the sensor may identify the color of printing paper based on the range of voltage values that vary depending on the light reflected from the printing paper, so that the color of the printing paper can be accurately determined.

According to any one of the above-described solutions, when the through hole may be formed in one side wall opposite to the second sensor, the reflection of light is suppressed by the through hole, so that the color of printing paper can be determined while detecting the presence/absence of the printing paper through the through hole.

According to any one of the above-described solutions, either the manual setting of the color of printing paper or the automatic setting of the color of printing paper may be selected through the manual switch, so that the intensity of printing can be adjusted even when the color of the printing paper is not automatically detected.

According to any one of the above-described solutions, when printing paper is identified as colored paper, the host device communicatively connected to the printing apparatus is queried whether to adjust the intensity of printing, so that the intensity of printing can be adjusted selectively. Furthermore, in the process of querying the host device, an ASB command may be applied with information about the color of the printing paper included therein, so that the color of the printing paper can be accurately provided to the host device.

According to any one of the above-described solutions, in the case where printing paper is identified as colored paper, when the transfer speed of the printing paper may be changed to a lower speed, a historical level for of the heating operation of the print head is changed to a lower level, so that the deterioration of the print head can be prevented.

According to any one of the above-described solutions, the near end of printing paper may be recognized through the black mark formed on the printing paper, so that the time at which the printing paper needs to be replaced can be easily identified.

According to any one of the above-described solutions, when the cover is opened/closed, the controller may check the near end of printing paper while performing printing by operating the sensor only for a predetermined period of time, and may periodically re-operate the sensor when the near end of the printing paper is not detected during a printing process, thereby reducing the load on the sensor.

The effects that can be obtained by the embodiments disclosed herein are not limited to the effects described above, and other effects not described above will be clearly understood by those having ordinary skill in the art, to which the present invention pertains, from the foregoing description.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued through the present specification should be defined by the attached claims, rather than the detailed description. All modifications and variations which can be derived from the meanings, scopes and equivalents of the claims should be construed as falling within the scope of the present invention.

What is claimed is:

1. A printing apparatus, the printing apparatus being mounted with roll-shaped drawable printing paper made of thermal paper whose color changes by heat, performing printing on the printing paper and cutting the printing paper via a cutter, the printing apparatus comprising:

a printer configured to perform printing by providing heat to the printing paper via a print head while transferring the printing paper at a predetermined speed via a platen roller;

a sensor configured to identify a color of the printing paper; and a controller configured to control the printer based on a detection result of the sensor to adjust an intensity of printing for the printing paper while adjusting at least one of printing speed of the printing paper and heating time for the printing paper.

2. The printing apparatus of claim 1, wherein the sensor includes:

a first sensor configured to determine presence/absence of the printing paper; and a second sensor configured to identify the color of the printing paper.

3. The printing apparatus of claim 2, wherein:

the second sensor radiates light toward the printing paper, and detects an amount of received light while receiving reflected light; and the controller identifies the color of the printing paper based on a range of voltage values that vary depending on the amount of light detected by the second sensor.

4. The printing apparatus of claim 1, wherein the sensor includes:

a second sensor configured to radiate light toward the printing paper, receive reflected light, and identify presence/absence of the printing paper and the color of the printing paper based on a range of voltage values that vary depending on the received light; and a hole formed in one side wall opposite to the second sensor and configured to suppress reflection of the light radiated by the second sensor.

5. The printing apparatus of claim 1, wherein:

the printing paper includes black marks formed in a black pattern having a predetermined length on at least one of both sides of the printing paper and formed at regular intervals along a longitudinal direction of the printing paper;

the sensor identifies the black marks as well as the color of the printing paper and applies results of the identification to the controller; and the controller recognizes a near end of the printing paper based on the pattern of the black marks detected through the sensor and performs an event for the near end of the printing paper.

6. The printing apparatus of claim 5, further comprising:

a cover configured to selectively open and close a paper accommodation portion in which the printing paper is accommodated; and a third sensor configured to detect opening/closing of the cover and apply results of the detection to the controller;

wherein the controller, when the opening/closing of the cover is detected via the third sensor, operates the sensor only while the printing paper is transferred over a predetermined length to identify the color of the printing paper and the black marks, detect the near end of the printing paper, and then perform printing, and, when the near end of the printing paper is not detected until a printing length of the printing paper reaches a predetermined length, re-operates the sensor.

7. The printing apparatus of claim 1, further comprising a manual switch provided on one side of a paper accommodation portion in which the printing paper is accommodated and configured to receive, from a user, a selection of one of a manual setting of the color of the printing paper through selection of the user and an automatic setting of the color of the printing paper through results of the identification of the sensor.

8. The printing apparatus of claim 1, wherein the controller queries a host device, communicatively connected to the printing apparatus, whether to adjust the intensity of printing when colored printing paper is detected via the sensor.

9. The printing apparatus of claim 8, wherein the controller queries the host device whether to adjust the intensity of printing via an Automatic Status Back (ASB) command including information about the color of the printing paper, receives a response as to whether to adjust the intensity of printing according to the color of the printing paper from the host device, and adjusts the intensity of printing based on the response received from the host device.

10. The printing apparatus of claim 1, wherein the controller changes a historical level when transfer speed of the platen roller is changed while monitoring the historical level for a heating operation of the print head according to the transfer speed of the platen roller.

11. The printing apparatus of claim 10, wherein the controller changes the historical level to a lower level when the transfer speed of the platen roller is changed to a lower speed.

12. The printing apparatus of claim 1, further comprising storage configured to store a program for printing operation and store a printing command input from a user.

13. A printing method, the printing method being performed by a printing apparatus that transfers roll-shaped printing paper, made of thermal paper whose color changes by heat, at a predetermined speed, performs printing by providing heat to the printing paper and cuts the printing paper, the printing method comprising:

identifying a color of the printing paper; and adjusting an intensity of printing for the printing paper by adjusting at least one of transfer speed of the printing paper and heating time for the printing paper according to the identified color of the printing paper while performing printing on the printing paper.

14. The printing method of claim 13, wherein identifying the color of the printing paper includes radiating light toward the printing paper and identifying the color of the printing paper based on a range of voltage values that vary depending on reflected and received light.

15. The printing method of claim 13, wherein:

identifying the color of the printing paper includes identifying black marks formed in a black pattern on one side of the printing paper and formed at regular intervals along a longitudinal direction of the printing paper as well as the color of the printing paper; and the printing method further comprises:

after identifying the black marks as well as the color of the printing paper, recognizing a near end of the printing paper based on the pattern of the black marks; and performing an event for the near end when the near end is recognized.

16. The printing method of claim 15, further comprising:

before identifying the color of the printing paper as well as the black marks, detecting opening/closing of a cover of the printing apparatus, and, when the cover of the printing apparatus is detected, performing identifying the color of the printing paper as well as the black marks only while the printing paper is transferred over a predetermined length;

after recognizing the near end of the printing paper, checking whether a printing length of the printing paper over which the near end is not recognized reaches a predetermined length; and when the printing length of the printing paper over which the near end is not recognized reaches the predetermined length, re-identifying the color of the printing paper as well as the black marks.

17. The printing method of claim 13, further comprising receiving, from a user, a selection of one of a manual setting of the color of the printing paper through selection of the user and an automatic setting of the color of the printing paper through identifying the color of the printing paper.

18. The printing method of claim 13, further comprising, when colored printing paper is detected in identifying the color of the printing paper, querying a host device, communicatively connected to the printing device, whether to adjust the intensity of printing for the printing paper.

19. The printing method of claim 13, further comprising changing a historical level when transfer speed of the printing paper is changed while monitoring the historical level for a heating operation associated with heat applied to the printing paper according to the transfer speed of the printing paper.

20. A non-transitory computer-readable storage medium having stored thereon a program that, when executed by a processor, causes the processor to execute the printing method of claim 13.

* * * * *